(12) United States Patent
Labrie

(10) Patent No.: US 10,938,972 B1
(45) Date of Patent: Mar. 2, 2021

(54) CELLULAR MONITORING APPLICATION

(71) Applicant: Martin Labrie, Montreal (CA)

(72) Inventor: Martin Labrie, Montreal (CA)

(73) Assignee: Martin Labrie, Montreal (CA)

( * ) Notice: Subject to any disclaimer, the term of this patent is extended or adjusted under 35 U.S.C. 154(b) by 0 days.

(21) Appl. No.: 16/705,796

(22) Filed: Dec. 6, 2019

(51) Int. Cl.
  *H04W 24/00* (2009.01)
  *H04M 1/725* (2021.01)
  *H04W 24/06* (2009.01)
  *H04W 24/10* (2009.01)
  *H04W 4/02* (2018.01)

(52) U.S. Cl.
  CPC ......... *H04M 1/72522* (2013.01); *H04W 4/02* (2013.01); *H04W 24/06* (2013.01); *H04W 24/10* (2013.01)

(58) Field of Classification Search
  CPC ... H04M 1/72522; H04W 24/06; H04W 4/02; H04W 24/10
  USPC ....................................................... 455/456.3
  See application file for complete search history.

(56) References Cited

U.S. PATENT DOCUMENTS

| | | | | |
|---|---|---|---|---|
| 7,471,956 B2 * | 12/2008 | Byford | ............ | H04W 4/02 455/456.6 |
| 7,764,954 B2 * | 7/2010 | Beyer, Jr. | ............ | G06F 16/29 455/416 |
| 8,417,239 B1 * | 4/2013 | DeCusatis | ............ | H04W 24/08 455/423 |
| 8,452,353 B2 * | 5/2013 | Crawford | ............ | H04W 52/0258 455/574 |
| 8,589,230 B1 * | 11/2013 | Bickerstaff | ............ | G06Q 30/0251 705/14.58 |
| 8,837,370 B2 * | 9/2014 | Mohammed | ............ | H04W 24/08 370/328 |
| 8,838,586 B2 * | 9/2014 | Waldman | ............ | G01C 21/3617 707/724 |
| 9,078,099 B2 * | 7/2015 | Farley | ............ | G01S 5/0252 |
| 9,451,451 B2 * | 9/2016 | Chow | ............ | H04L 67/306 |
| 9,698,897 B2 * | 7/2017 | Harrang | ............ | H04W 24/02 |
| 9,846,525 B2 * | 12/2017 | Saulnier | ............ | G06F 3/0482 |
| 10,073,179 B2 * | 9/2018 | Driscoll | ............ | G01S 19/49 |
| 10,165,059 B2 * | 12/2018 | Haney | ............ | H04L 67/1046 |
| 10,440,675 B2 * | 10/2019 | Socaciu | ............ | H04W 24/06 |
| 2004/0243307 A1 * | 12/2004 | Geelen | ............ | G01S 19/24 701/469 |
| 2009/0247186 A1 * | 10/2009 | Ji | ............ | G01S 5/12 455/456.1 |
| 2015/0181449 A1 * | 6/2015 | Didenko | ............ | H04W 24/04 455/67.11 |
| 2018/0293595 A1 * | 10/2018 | McMaster | ............ | H04L 67/22 |

(Continued)

*Primary Examiner* — Amancio Gonzalez
(74) *Attorney, Agent, or Firm* — Stratford Managers Corporation

(57) ABSTRACT

A cellular monitoring system comprising an application on a plurality of mobile devices recording the strength of a cellular signal received at a mobile device along with a GPS coordinates of the mobile device at time of said recording, wherein said application transmits the monitored signal strength along with said GPS coordinates to a backend application executed on a server. The backend application consolidates the monitored signal strength and said GPS coordinates with one or more previously monitored signal strength and GPS coordinate and preparing a geographical map of the monitored signal strength to be displayed by the application on the mobile device.

6 Claims, 5 Drawing Sheets

(56) References Cited

U.S. PATENT DOCUMENTS

| | | | | |
|---|---|---|---|---|
| 2018/0332557 A1* | 11/2018 | Vuornos | ................ | H04W 4/02 |
| 2019/0200267 A1* | 6/2019 | Meredith | .............. | H04W 36/30 |
| 2019/0369202 A1* | 12/2019 | Smith | ...................... | H04N 7/18 |

* cited by examiner

300

CONSOLIDATE DATA 302

MERGE DATA 304

UPDATE HEAT MAP 306

FIG. 3

CELLULAR MONITORING APPLICATION

BACKGROUND

Cellular service quality varies greatly as a function of the distance to the cellular towers and other factors.

Many applications on mobile devices require cellular data availability. There is a need to know where cellular data service is available and what quality can be achieved. There is a need for this information to be continuously updated by as many users as possible to maintain an up to date map of cellular service quality for one or more service provider.

BRIEF SUMMARY

A cellular monitoring system is disclosed comprising an application on a plurality of mobile devices recording the strength of a cellular signal received at one of said mobile device along with a GPS coordinates of said one mobile device at time of said recording, wherein said application transmits the monitored signal strength along with said GPS coordinates to a backend application and said backend application executed on a server consolidating the monitored signal strength and said GPS coordinates with one or more previously monitored signal strength and GPS coordinate and preparing a geographical map of the monitored signal strength to be displayed by the application on the mobile device.

In another embodiment, the cellular monitoring system performs an internet test to evaluate internet connectivity when said monitored signal strength is below a predetermined threshold and wherein said internet test may comprise accessing a web page and accessing an application on the backend and receiving a response.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates how the data is consolidated and presented to the user.

DETAILED DESCRIPTION

Figure 1:
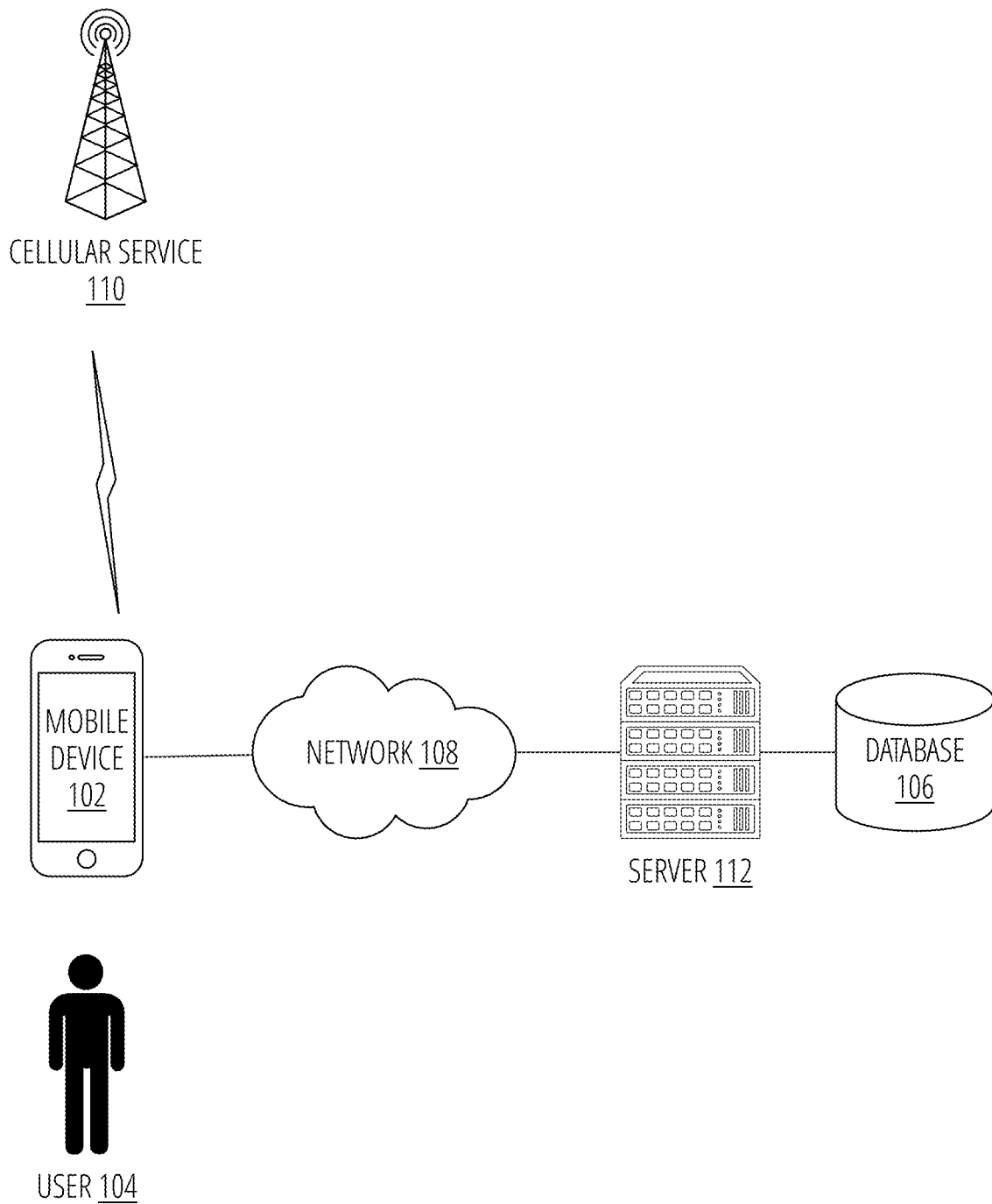
FIG. 1 illustrates a system to monitor the quality of cellular service.

FIG. 1 depicts a system to monitor the quality of the cellular data service. A user 104 uses an application on a mobile device 102 which is connected to the cellular service 110 of a service provider. The user can be walking or in a vehicle. When enabled, a cellular monitoring application on the mobile device 102 monitors the strength of the cellular service 110 received by the mobile device 102 and records the signal strength along with GPS coordinates 114 and time. The monitoring data is sent to an analysis software on a server 112 and stored in a database 106. The monitoring is done at regular intervals. The intervals can be set in time or change in GPS coordinates. The interval frequency can change based on the speed at which the user 104 is moving (for example, the monitoring is less frequent if the user is walking than if the user is moving by car).

When several users are using the cellular monitoring application, their data is consolidated to provide a detailed an accurate map of the cellular data service quality for a given service provider.

The cellular monitoring application can be embedded in other applications such as applications that monitor the road traffic conditions. In this case the road traffic conditions can be displayed in combination with the cellular service quality.

Figure 2:
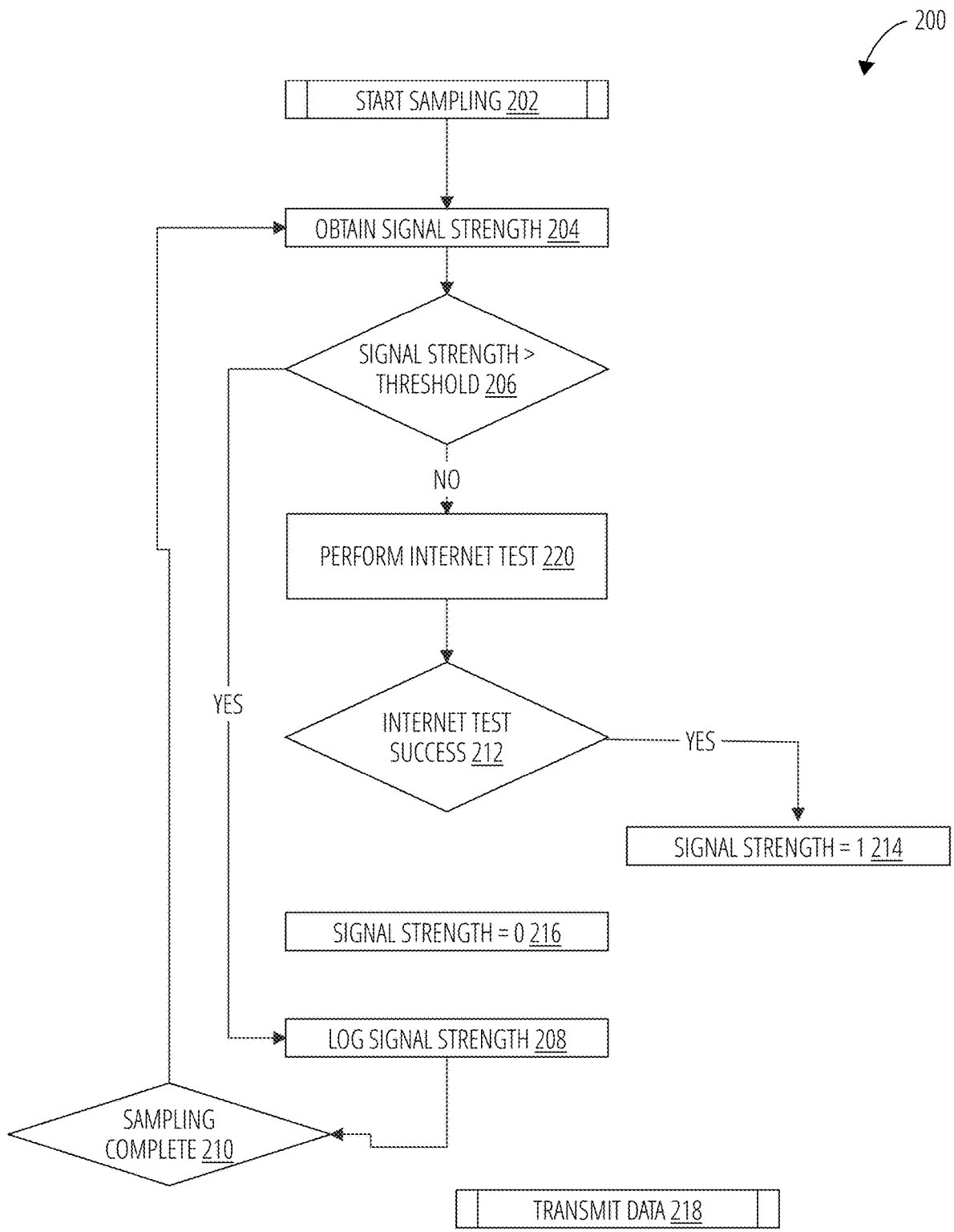
FIG. 2 illustrates an embodiment to monitor the cellular data quality.

FIG. 2 depicts one embodiment of the system. The cellular monitoring application starts a sampling period. The beginning of the sampling period can be triggered by the user or automatically triggered when the user moves at least at a predetermined speed.

During a sampling period, the application captures the signal strength received by the mobile device 102. The information is obtained through the operating system 204 of the mobile device 102. Signal strength is generally a number from 0 to 5. However, any relative representation of signal strength could be used. If the signal strength is greater than a threshold 206, the signal strength is logged along with the current GPS coordinates.

If the signal strength is lower than a threshold 206 but greater than zero, an internet test is performed 220 to establish whether internet connectivity can be achieved. The internet test may consist for example in having the application access an internet page (e.g. Google.com), if this is successful, that means basic internet is available. The application then reaches the backend application on the server to get a response and validate viable cellular data capacity when the backend application responds. If the access to the internet or the backend response is not available the internet test is not a success and the signal strength is set to zero. Any other means of testing whether the internet is accessible known in the art can be used.

The signal strength is logged along with the GPS signals 208 and the time of day.

The sampling can continue for a predetermined number of samples or it can be done for a predetermined duration of time or it can continue until the user stops the sampling manually. When the sampling is complete 210, the sampling data is transmitted to the backend application on the server 112 for analysis. The transmission of the sampling data can be done automatically or triggered by the user 104.

FIG. 3 depicts the backend application process. When the sampling data is received it is merged with other data for the same service provider 304. A heat map is created based on the new data to show cellular strength (see FIG. 4 as example). Any mapping software known in the art can be used in the background.

When the data is merged, the backend application may optionally extract outliers as compared to previous data obtained by the system. The backend application may also optionally age some previous data and replace with the newer data. Optionally, the backend application merges the information by averaging the signal strengths measured by two or more users in a similar location radius.

The user of the cellular monitoring application pulls relevant heat maps to see where cellular service 110 is available and at what quality.

Figure 4:
FIG. 4 illustrates a heat map of cellular reception strength

FIG. 4 illustrates an example of a heat map showing the strength of the cellular reception as a function of GPS coordinate. The map can be zoomed, and any other mapping functions known in the art can be used. The user can search for the closest location with cellular service of a specific strength.

Figure 5:
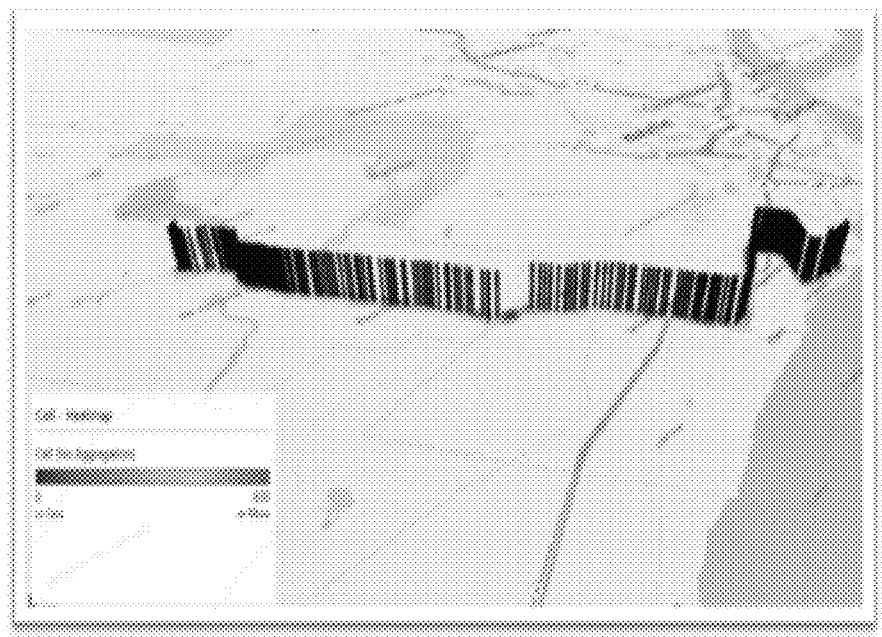
FIG. 5 illustrates the successful samplings

FIG. 5 illustrated a display of the internet test attempts that were successful using bar graph superimposed on the heat map.

What is claimed is:

1. A collaborative system for monitoring a cellular signal strength received by a plurality of mobile devices subscribed to one of a plurality of service providers comprising:

an application on each of said plurality of mobile devices recording the strength of said cellular signal received at said mobile device along with a GPS coordinates of said mobile device at time of said recording, wherein said application transmits the monitored signal strength along with said GPS coordinates to a backend application;

said backend application executed on a server consolidating the monitored signal strength and said GPS coordinates with one or more previously monitored signal strength and GPS coordinates relating to said service provider of said mobile device and preparing a geographical map of the monitored signal strength to be displayed by the application on the mobile device relating to said service provider and said backend application testing an internet connectivity when said signal strength is below a predetermined threshold.

2. The cellular monitoring system of claim 1 wherein said application performs an internet test to evaluate internet connectivity when said monitored signal strength is below a predetermined threshold.

3. The cellular monitoring system of claim 2 wherein said internet test comprises accessing a web page and accessing an application on the backend and receiving a response.

4. A method for monitoring a cellular signal strength received by a plurality of mobile devices subscribed to one of a plurality of service providers comprising:

recording, by an application on each of said plurality of mobile devices, the strength of said cellular signal received at said mobile device along with a GPS coordinates of said mobile device at time of said recording;

transmitting, by said application, the monitored signal strength along with said GPS coordinates to a backend application executed on a server;

consolidating, by said backend application, the monitored signal strength and said GPS coordinates with one or more previously monitored signal strength and GPS coordinates relating to said service provider of said mobile device; and preparing a geographical map of the monitored signal strength to be displayed by the application on the mobile device relating to said service provider and said backend application testing an internet connectivity when said signal strength is below a predetermined threshold.

5. The method of claim 4 further comprising performing, by application, an internet test to evaluate internet connectivity when said monitored signal strength is below a predetermined threshold.

6. The method of claim 5 wherein said internet test further comprises accessing a web page and accessing an application on the backend and receiving a response.

* * * * *